(12) United States Patent
Sallinen et al.

(10) Patent No.: US 11,458,343 B2
(45) Date of Patent: Oct. 4, 2022

(54) TRAMPOLINE FRAME STRUCTURE AND TRAMPOLINE

(71) Applicant: Acon Finland Oy Ltd, Oulu (FI)

(72) Inventors: Tuomas Sallinen, Oulu (FI); Jari Kiviniemi, Siikajoki (FI); Timo Luhtaniemi, Oulu (FI)

(73) Assignee: ACON FINLAND OY LTD, Oulu (FI)

( * ) Notice: Subject to any disclaimer, the term of this patent is extended or adjusted under 35 U.S.C. 154(b) by 0 days.

(21) Appl. No.: 17/619,010

(22) PCT Filed: Jun. 9, 2020

(86) PCT No.: PCT/FI2020/000009
§ 371 (c)(1),
(2) Date: Dec. 14, 2021

(87) PCT Pub. No.: WO2020/254716
PCT Pub. Date: Dec. 24, 2020

(65) Prior Publication Data
US 2022/0212049 A1  Jul. 7, 2022

(30) Foreign Application Priority Data

Jun. 17, 2019 (FI) .................................. 20197091

(51) Int. Cl.
*A63B 5/11* (2006.01)
*F16B 7/04* (2006.01)
(52) U.S. Cl.
CPC ............ *A63B 5/11* (2013.01); *F16B 7/0413* (2013.01); *F16B 7/0446* (2013.01)

(58) Field of Classification Search
CPC .... A63B 5/11; E04F 11/1808; E04F 11/1836; E04H 17/1465; E04H 17/1488; F16B 7/02; F16B 7/04; F16B 7/0406
See application file for complete search history.

(56) References Cited

U.S. PATENT DOCUMENTS 8,920,290 B2 * 12/2014 Stokes ...................... A63B 5/11
482/27
9,399,152 B2 * 7/2016 Yang ..................... A63B 71/022
(Continued)

FOREIGN PATENT DOCUMENTS

CA        2521147 A1 *  3/2007  ............... A63B 5/11
CN     201757111 U       3/2011
(Continued)

OTHER PUBLICATIONS

Translation of CN 201757111 U.
(Continued)

*Primary Examiner* — Jonathan P Masinick
(74) *Attorney, Agent, or Firm* — Jacob Eisenberg (57) ABSTRACT

A trampoline frame structure that comprises multiple transverse pipes, joint sleeve structures and leg arrangements is disclosed. The joint sleeve structures serve to connect transverse pipes to form a rim structure. Leg arrangements are connected to the joint sleeve structures. At the upper end of the joint sleeve structure is an elongated headpiece, and at both of the ends of the headpiece are sockets. The cross-section of the socket is polygonal. At the ends of the transverse pipes are conical connection extensions, and the cross-sections of the extensions correspond to the cross-sections of the sockets. The assembled rim structure comprises the transverse pipes with the headpieces between them.

15 Claims, 4 Drawing Sheets

(56) References Cited

U.S. PATENT DOCUMENTS

| | | | |
|---|---|---|---|
| D785,740 S * | 5/2017 | Bisang | D21/797 |
| 10,265,562 B2 * | 4/2019 | Woodman | A63B 71/0054 |
| 10,549,136 B2 * | 2/2020 | Hsiang | A63B 71/0054 |
| 10,617,901 B2 * | 4/2020 | Mehr | A63B 5/11 |
| 2009/0023558 A1 * | 1/2009 | VanElverdinghe | A63B 71/022 482/29 |
| 2010/0240496 A1 * | 9/2010 | Chen | A63B 5/11 482/27 |
| 2012/0289379 A1 | 11/2012 | Stokes | |
| 2017/0361143 A1 | 12/2017 | Mehr et al. | |

FOREIGN PATENT DOCUMENTS

| | | | | |
|---|---|---|---|---|
| CN | 106823241 A * | 6/2017 | | |
| CN | 109364423 A * | 2/2019 | | A63B 5/11 |
| EP | 3156105 A1 * | 4/2017 | | A63B 5/11 |
| GB | 2429659 A * | 3/2007 | | A63B 5/11 |
| KR | 20170123943 | 11/2017 | | |

OTHER PUBLICATIONS

Translation of KR20170123943.
Office Action for FI20197091 dated Jan. 15, 2020; OEE Workproduct.

* cited by examiner

TRAMPOLINE FRAME STRUCTURE AND TRAMPOLINE

CROSS REFERENCE TO RELATED APPLICATIONS

This application is a national phase application of international patent application PCT/FI2020/000009, filed Jun. 9, 2020, which claims priority to Finnish patent application 20197091, filed on Jun. 17, 2019, the content of both of which is hereby incorporated by reference.

BACKGROUND OF THE INVENTION

The present disclosure relates to a trampoline frame structure for supporting a mat, and the frame structure comprises multiple transverse pipes having a first end of transverse pipe and a second end of the transverse pipe, multiple joint sleeve structures for connecting the transverse pipes to form a rim structure and leg arrangements. The invention relates also to a trampoline having a frame structure.

Trampolines are commonly used in outdoor and indoor activities. Trampolines comprise a frame structure and a mat connected to the frame structure with stretching elements such as springs or similar.

Outdoor trampolines have a diameter of over 2 metres, generally 3 to 5 metres. The mat of said devices is located at least 60 to 100 centimetres above the ground. On devices of this type, people attempt to jump as high as possible. During landing, the trampoline is subjected to forces that correspond to a multiple of the user's weight. In the case of outdoor trampolines, loadings in the region of four to eight times the gravitational acceleration occur. Jump frequency can be up to 40 to 60 times per minute. So that forces of this type can be permanently absorbed by the device, the mats must be connected to the frame structure with powerful springs of various types or other elastic elements, for example, rubber cables, rubber bands, pre-stressed carbon or spring steel strips. In addition to the vertically acting forces, considerable horizontal forces or transverse forces can also act on the frame structure. It follows from the abovementioned facts that outdoor trampolines require a solid frame structure that can withstand a multitude of torsion forces.

In addition to the outdoor trampolines (it must be noted that outdoor trampolines can be used indoors if the facility is suitable, i.e. large enough), there are so called mini trampolines. Mini trampolines customarily feature a diameter of 100 to 150 centimetres. Their rebounding mat is positioned 20 to 35 centimetres above the ground. Devices of this type are used for improving personal health, for relaxation and for physiotherapeutic exercises. Their usage can be described as rocking, swinging and slight jumping. The mat plane is configured for maximum jump heights of 10 to 40 centimetres.

Mini trampolines are generally used at home or in bespoke spaces such as gyms. Often, the mini trampolines are frequently erected or moved. This requirement translates into a demand for lightweight but nevertheless stable structures. The weight of mini trampolines usually does not exceed 10 to 15 kilograms. Mini trampolines are nearly always delivered in an assembled state.

It is common to both trampoline types that they are difficult to store and noisy when a user is jumping on the trampoline.

In some trampoline frame structures, the trampoline frame parts have been welded to their legs. The mat in the centre of the circle formed by the trampoline frame parts is stretched out by the springs or similar elastic elements. The trampoline frame parts are welded to each other, and the trampoline frame parts are welded to their legs as well. However, the welds are susceptible to corrosion, and the welds may fail during use, which is a safety hazard. Furthermore, the welded trampoline frame structure cannot be disassembled any longer, and when stored, it occupies much space.

There are trampoline frame structures in which a rim structure around the mat is constructed from several separate transverse pipes that are connected to each other with joint sleeve structures. Also, the legs are connected in a detachable manner to the trampoline frame. The transverse pipes are connected to the joint sleeve structures with some clamping arrangements, such as bolts or screws, which penetrate through both the joint sleeve structure and the end of the transverse pipe to fix them together. One such trampoline frame structure is disclosed by patent publication FI20065036. However, the structure that the publication describes is still quite cumbersome to assemble.

Patent publication US20170361143 discloses a frame structure for a mini trampoline. It comprises transverse pipes, joint sleeve structures and legs. The publication mentions that in order to reduce noise from the legs, they have the following arrangement. The joint sleeve structure has a conical depression and threaded bolt in the middle of the depression to accept the hollow cone at the end of the leg. To fix the leg, it is screwed into the conical depression on the joint sleeve structure. However, the structure itself is quite complicated to manufacture and the threads are prone to breakage. Also, if there is dirt between the leg cone and the walls of the depression, it may lead to a situation where the leg is not properly fixed to the joint sleeve structure and the frame structure may wobble somewhat. This may lead to fractures to the frame structure. CN201757111 discloses a similar type of a frame structure for a trampoline. The frame structure comprises a frame pipe, a foot pipe, and a threeway member for connecting the pipes. This structure has same problems.

There is a clear need for a simple and reliable trampoline frame structure.

BRIEF SUMMARY OF THE INVENTION

An object of the invention is a solution that can significantly reduce the disadvantages and drawbacks of the prior art. In particular, the object of the invention is a solution where a device is trampoline frame structure that is silent and easy to assemble.

The objects of the invention are attained with a device that is characterised by what is stated in the independent patent claims. Some advantageous embodiments of the invention are disclosed in the dependent claims.

The inventor has discovered that the main source of the noise that a modern trampoline produces are the interconnections between the transverse pipes and the joint sleeve structures. When the trampoline is used, the stretching elements pull the rim structure inwards and in doing so, deform it. The transverse pipes and the joint sleeve structures contribute to the deformation differently, causing slight movements between the connection surfaces and these movements produce sound. This finding contradicts the conventional belief that the trampoline noise is caused by elastic elements such as springs.

The invention is a trampoline frame structure that comprises multiple transverse pipes, joint sleeve structures and leg arrangements. The joint sleeve structures interconnect the transverse pipes to form a rim structure. The leg arrangements connect to the joint sleeve structures. At the upper end of the joint sleeve structure is an elongated headpiece and at both ends of the headpiece there are sockets. The cross-section of the socket is polygonal. At the ends of the transverse pipes are at least partly pyramidical connection extensions and the cross-sections of the extensions correspond to the cross-sections of the sockets. The assembled rim structure comprises the transverse pipes with the headpieces between them.

When reference is made in the text to the upper or the lower parts or respective directions such as down or up, a situation is described in which the trampoline according to the invention is in use. Also, when reference is made to the vertical or horizontal directions or surfaces, the trampoline is placed similarly.

In one embodiment of the invention is a trampoline frame structure for supporting a mat, and the frame structure comprises multiple transverse pipes having a first end of the transverse pipe and a second end of the transverse pipe, multiple joint sleeve structures for interconnecting the transverse pipes to form a rim structure and leg arrangements. In one advantageous embodiment of the invention, the joint sleeve structure comprises an elongated headpiece having a first end of the headpiece, a second end of the headpiece and a middle point of the headpiece, and at both ends of the headpiece is a socket having a longitudinal axis and an angular cross-section of the socket. The socket has a narrowing part that extends from the end of the headpiece to a point between the end of the headpiece and the middle point of the headpiece. The diameter of the cross-section of the narrowing part is largest at the end of the headpiece and the cross-section narrows towards the opposite end of the narrowing part, and the transverse pipe comprise a first connection extension at the first end and a second connection extension at the second end. The first connection extension and the second connection extension have an angular cross-section that corresponds to the cross-section of the socket, and the first connection extension and the second connection extension are configured to fill the corresponding narrowing part at least partly to fit the corresponding socket in order to form the rim structure with the transverse pipes having the headpieces between them. This kind of structure is easy to assemble and it significantly reduces the noise originating from the frame, because the transverse pipe and the joint sleeve structure and in particular the headpiece twist in a similar way, and there is no significant transformation gradient in the joint between the joint sleeve structure and the transverse pipe.

In one embodiment of the trampoline frame structure, the cross-section of the transverse pipe is oval-shaped, and the transverse pipe has a first diameter and a second diameter, and the first diameter is parallel to the plane of the rim structure and the second diameter is transverse to the plane of the rim structure, and the first diameter is the largest diameter of the transverse pipe. This feature diminishes twisting of the transverse pipe when the trampoline is in use. In a second embodiment of the trampoline frame structure, the first diameter of the transverse pipe is 1.25 times larger or more than the second diameter of the transverse pipe. The inventor has discovered that the rigidity is more pronounced when this limit is exceeded.

In a third embodiment of the trampoline frame structure, the angular cross-section of the socket at the one end of the headpiece has one edge which is parallel to the first diameter and another edge which is parallel to the second diameter. The inventor has discovered that these positions of the sides are quite efficient for spreading the transformation forces evenly over the joint sleeve structure and the transverse pipe.

In a fourth embodiment of the trampoline frame structure, the socket is configured in such a way that when the connection extension is fit into the socket, the socket has free space at the bottom of the socket, and this free space is inside the narrowing part or some another part of the socket. If there is dirt or other impurities between the connection extension and the socket walls, these will gather in the free space. This feature prevents or at least diminishes wobbling between the parts.

In a fifth embodiment of the trampoline frame structure, the angular cross-section of the socket is rectangular. The structure of this feature is easy to manufacture. Also, it provides possibilities to place the long sides for transferring forces between the joint sleeve structure and the transverse pipe.

In a sixth embodiment of the trampoline frame structure, the connection extensions have a first end of the connection extension and a second end of the connection extension, and the first end of the connection extension is on one end of the transverse pipe, and the second end of the connection extension is flat. This feature improves the design of the free space and eliminates thin parts from the connection extension where torsion forces could damage the connection extension. In a seventh embodiment of the trampoline frame structure, the maximum diameter of the second end of the connection extension is shorter than the maximum diameter of the first end of the connection extension. The connection extension is therefore a conical or at least partly pyramidical structure with its top cut off. This feature makes it easier to assemble the rim structure.

In an eight embodiment of the trampoline frame structure, the joint sleeve structure has a first fixing arrangement that is meant for the leg arrangement, and the first fixing arrangement is configured in such a way that when the leg arrangement is fixed to the joint sleeve structure, the longitudinal axis of the leg structure is vertical and outside of the rim structure. The inventor has discovered that this feature lessens the stress forces caused by the leg. In a ninth embodiment of the trampoline frame structure, the frame structure has a multitude of support pipes for safety equipments, and the joint sleeve structure has a second fixing arrangement that is for the support pipe, and the second fixing arrangement is configured in such a way that when the support pipe is fixed to the joint sleeve structure, the longitudinal axis of the support pipe and the longitudinal axis of the leg arrangement are congruent. This feature provides a stable fixing point for the support pipes without having to drill holes or weld the rim structure.

In a tenth embodiment of the trampoline frame structure, the angles between the side surfaces of the connection extension and the end of the transverse pipe are at least 55 degrees or more. It was discovered that more gradual slopes do not provide as good fixing properties.

In an eleventh embodiment of the trampoline frame structure, the connection extension has opposite side surfaces and the tilt angles of these opposite side surfaces are identical.

In a twelfth embodiment of the trampoline frame structure, the joint sleeve structure further comprises a joint sleeve extension extending downwards and outwards in relation to the rim structure, and the joint sleeve structure further comprise a joint sleeve structure support part extending from under the headpiece to the joint sleeve extension. This structure makes the rim structure more rigid.

In a thirteenth embodiment of the trampoline frame structure, there is at both ends of the transverse pipe a transverse pipe end collar, and the transverse pipe end collar comprises an end surface, and the end surface and the connection extension are configured in such a way that the longitudinal axis of the connection extension is perpendicular to the end surface and the longitudinal axis of the connection extension and the longitudinal axis of the narrowing part of the socket are parallel when the transverse pipe is attached to the joint sleeve structure.

In one embodiment of the invention is a trampoline comprising a frame structure. In one advantageous embodiment, the frame structure comprises transverse pipes and joint sleeve structures as was described before.

It is an advantage of the invention that it provides a trampoline frame structure that is easy to use, and it is applicable to many kinds of trampolines. Using the frame structure significantly improves the ease of assembly and storing. It also produces a frame structure that has no complex parts, so that it is easier to manufacture and maintain than trampoline frame structures according to known techniques. It also increases the rigidity of the rim structure, thus improving the bouncing properties of the trampoline.

One advantage of the invention is that it is quite efficient in reducing noise.

It is a further advantage of the trampoline frame structure that it can be easily optimized for different situations. Its scalability is good.

The invention also provides a trampoline frame structure that has fewer moving parts that move in relation to each other than trampoline frame structures according to known techniques. Thus, the structure according to the invention is more rigid and durable than known techniques.

BRIEF DESCRIPTION OF THE DRAWINGS

Further advantages features and details of the various embodiments of this disclosure will become apparent from 11 the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure In the following, the invention is described in detail. The description refers to the accompanying drawings, in which.

DETAILED DESCRIPTIONS OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C" then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination.

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
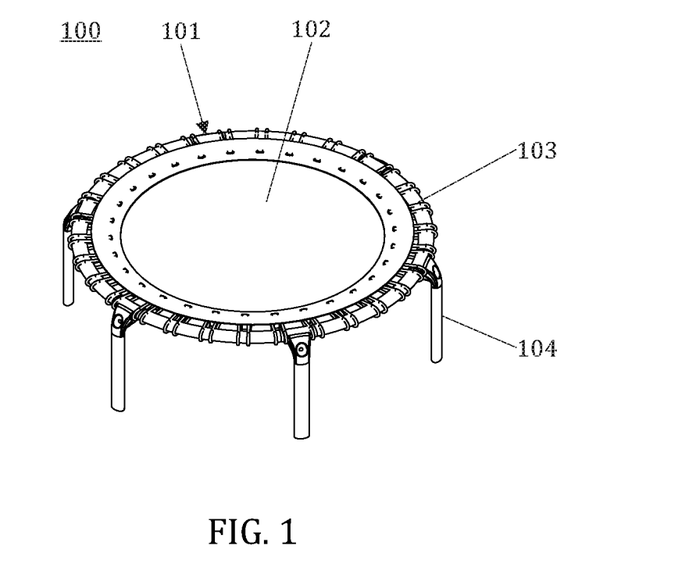
FIG. 1 depicts an example of a trampoline according to an embodiment.

FIG. 1 shows an embodiment of a trampoline 100. The trampoline comprises a circular rim structure 101 and a mat 102 in the middle of the rim structure. The mat is kept in its place with a multitude of elastic elements 103 such as springs or some such. These elastic elements also provide the bouncing effect for the user of the trampoline. A set of leg arrangements 104 are connected to the rim structure.

Figure 2:
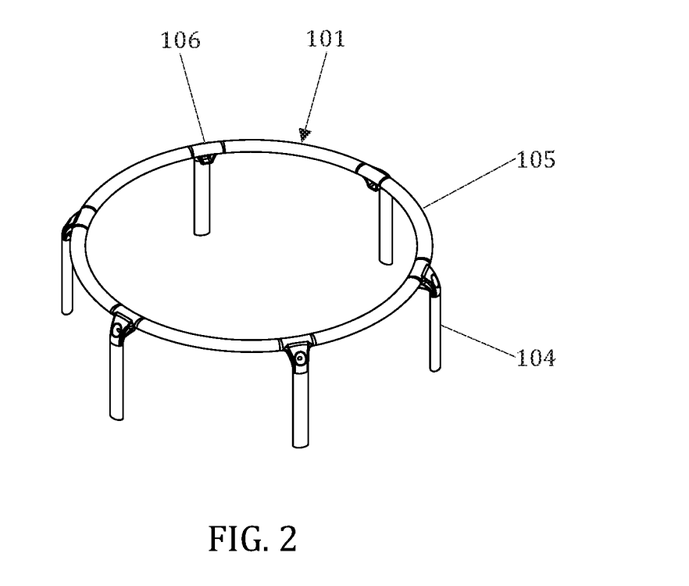
FIG. 2 depicts the trampoline frame structure of the trampoline presented in FIG. 1.

FIG. 2 shows a frame structure of the trampoline 100 presented in the FIG. 1. The frame structure comprises the rim structure 101 and the leg arrangements 104.

The rim structure 101 is in this example circular, but it can be oval or elliptical or rectangular with rounded corners. Usually sharp corners (i.e. angular corners) are avoided because they generate stress forces in the frame and the suspension of the mat is harder to arrange and maintain. Of course, there are some special purpose trampolines where those are used nonetheless. The rim structure comprises multiple transverse pipes 105 and joint sleeve structures 106 for connecting the transverse pipes to the rim structure. The rim structure is therefore formed by the transverse pipes and the parts of the joint sleeve structures that are located between the transverse pipes. Advantageously, the transverse pipes and the joint sleeve structures are configured in such a way that the shape of the rim structure is basically similar everywhere along the rim. The leg arrangements 104 are fixed to the joint sleeve structures.

The transverse pipes 105 are in this example identical, but naturally they can be shaped differently depending on the shape of the assembled rim structure 101. The transverse pipes are elongated pipes. In some embodiments they are hollow and in other embodiments they are solid. At the ends of the transverse pipe are connection extensions for connecting one end of the transverse pipe to the joint sleeve structure. The connection extensions have a socket arrangement for receiving the connection extension. In some embodiments, the connection extensions are configured in such a way that there is no need for additional fixing arrangements when attaching the transverse pipes to the joint sleeve structures. The connection extension will fit tightly into the socket, and thus the whole rim structure can be assembled easily. In use, the elastic elements hold the rim structure rigidly in form, and there is no danger of the trampoline frame structure parts coming apart.

It has been determined that contrary to common belief, the main source of noise in a trampoline are not the elastic elements or the joints of the leg arrangements, but the frame and more particularly, the connections between the transverse pipes 105 and the joint sleeve structures 106. When the user of the trampoline jumps on the mat, the elastic elements tighten and stretch. At the same time, the elastic elements pull at and rotate the rim structure 101 parts inwards and downwards. When the elastic elements and the mat propel the user upwards, the rim structure parts return to their original positions. Because the parts of the joint sleeve structures that form the rim structure are shorter than the transverse pipes, they tend to be subjected to less torque forces than the transverse pipes. Also, the leg arrangements give extra support to the joint sleeve structures. Therefore, the joint sleeve structures rotate less than the transverse pipes. The surfaces at the interconnection between the joint sleeve structure and the joint sleeve structure slide in relation to each other and produce noise. A trampoline frame structure has been developed, the trampoline frame structure including movements which are minimized and therefore, result in noise being reduced.

Figure 3:
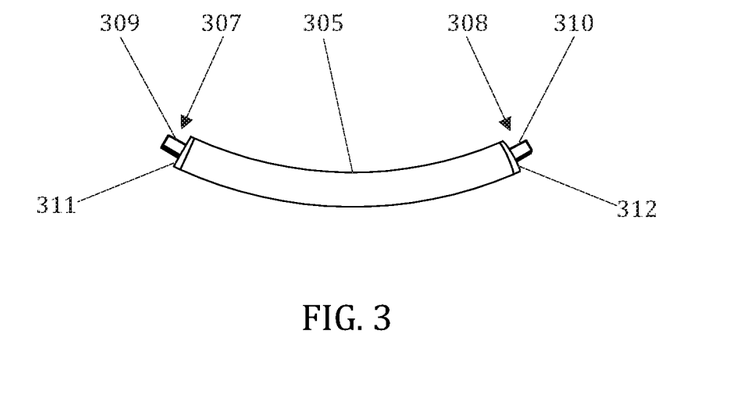
FIG. 3 depicts an example of a transverse pipe according to an embodiment.

FIG. 3 shows an example of a transverse pipe 305 according to an embodiment. The transverse pipe comprises a first end 307, a second end 308, a first connection extension 309, a second connection extension 310, a first transverse pipe end collar 311 and a second transverse pipe end collar 312.

The transverse pipe 305 is a curved elongated structure. In this embodiment, the cross-section of the transverse pipe is oval-shaped. The cross-section of the transverse pipe has a first diameter and a second diameter, and these diameters are perpendicular to each other. The first diameter is parallel to the plane of the rim structure and the second diameter is transverse to the plane of the rim structure. The first diameter is the larger of the transverse pipe. In some embodiments the first diameter of the transverse pipe is at least 1.25 times larger or more than the second diameter of the transverse pipe. The oval-shaped cross-section improves the durability of the rim structure and reduces torque forces that rotate the rim structure parts. Usually, the first diameter should not exceed the second diameter by 3 times or more, because otherwise the vertical durability of the transverse pipe will weaken, i.e. the transverse pipe may bend more easily if, for example, somebody jumps on it. Also, the shape of the joint sleeve structure will in that case become unnecessary complicated.

At the first end 307 are the first connection extension 309 and the first transverse pipe end collar 311. At the second end are the second connection extension 310 and the second transverse pipe end collar 312. The connection extensions are elongated bodies that are approximately parallel to the longitudinal axis of the transverse pipe 305. The cross-section of the connection extension is angular, i.e. it is polygonal. In some embodiments, the connection extension has opposite side surfaces and the tilt angles of these opposite side surfaces are identical. In some embodiments the cross-section of the connection extension is rectangular. In some embodiments the cross-section of the connection extension is octagonal. The connection extension narrows when it extends away from the end of the transverse pipe. The connection extension has therefore at least partly a pyramidical or a conical shape. In the connection extension is a first end of the connection extension and a second end of the connection extension, and the first end of the connection extension is at the end of the transverse pipe. The maximum diameter of the second end of the connection extension is smaller than the maximum diameter of the first end of the connection extension. In some embodiments, the connection extension resembles a pyramidical or a conical object that has its top cut off perpendicularty to the longitudinal axis of the connection extension, i.e. the second end of the connection extension is flat. In some embodiments, the angles between the side surfaces of the connection extension and the end surface of the transverse pipe are at least 55 degrees or more. It must be noted that the different sides may have different tilt angles. In some embodiments, some sides may have tilt angles of 90 degrees, i.e. they are perpendicular to the end surface of the transverse pipe. The pyramidical or conical connection extension is easily inserted into the socket in the sleeve joint structure. Also, when rotational forces attempt to rotate the connection extension, the narrower tip of the connection extension will produce less torque forces inside the joint sleeve structure.

The first transverse pipe end collar 311 and the second transverse pipe end collar 312 are used to form end surfaces for the first end 307 of the transverse pipe and the second end 308 of the transverse pipe respectively. In some embodiments, the end collar may be made of some elastic material to ensure a tight connection between the transverse pipe and the joint sleeve structure. In some embodiments, the end collar is made of the same material as the transverse pipe, such as metal, for example, or aluminium or steel. The end surface is configured to fit into the joint sleeve structure. Also, the connection extension is configured to be perpendicular to the end surface. In some embodiments, the end collar is a separate object and it is installed into the end of the transverse pipe when the parts of the trampoline structure are manufactured or when the frame is assembled.

Figure 4:
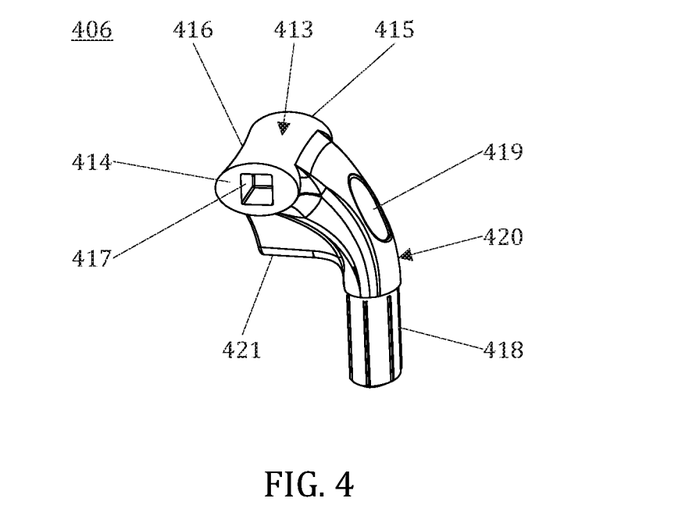
FIG. 4 depicts an example of a joint sleeve structure according to an embodiment.

FIG. 4 shows an example of a joint sleeve structure 406 according to an embodiment. The joint sleeve structure comprises a headpiece 413 and a joint sleeve extension 420.

The headpiece 413 is an elongated structure comprising a first end 414 of the headpiece, a second end 415 of the headpiece and a middlepoint 416 of the headpiece. At the both ends of the headpiece is a socket 417, i.e. there is a first socket at the first end of the headpiece and a second socket at the second end of the headpiece. The headpiece is essentially straight at least in comparison to the transverse pipe curvature when the transverse pipes are curved. The length of the headpiece is shorter than the length of the transverse pipe.

The socket 417 is configured to accept the connection extension for attaching the joint sleeve structure 406 and the transverse pipe to each other so as to form a part of the rim structure. The socket comprises a narrowing part that extends from the first end 414 of the headpiece to a point between the end of the headpiece and the middlepoint 416 of the headpiece. The cross-section of the narrowing part is angular, i.e. polygonal. The narrowing part is configured to accept the connection extension. The first end 414 of the headpiece and the second end 415 of the headpiece are configured to fit inside the ends of the transverse pipes, so that the seam between the transverse pipe and the joint sleeve structure 406 is as tight as possible. In the embodiment of FIG. 4, the cross-section of the headpiece, i.e. the end of the headpiece, is oval-shaped. In some embodiments, the cross-section of the socket is rectangular, and its opposing sides are parallel to the axis of the cross-section of the headpiece. The shape of the surfaces of the narrowing part follows the shape of the surfaces of the connection extension.

In some embodiments, the socket 417 is configured in such a way that when the connection extension is placed into the socket and the transverse pipe and the joint sleeve structure 406 are connected to each other, the socket has free space. This free space serves to collect dirt and thus ensures a tight fit of the connection extension. The free space may be part of the narrowing part or it may be some part of the socket. In some embodiments, the socket has an opening only at the end of the headpiece.

The joint sleeve extension 420 is a structure that extends downwards and outwards in relation to the rim structure. The joint sleeve extension has a first end of the joint sleeve extension and a second end of the joint sleeve extension. The headpiece 413 is fixed to the first end of the joint sleeve extension. From the connection point to the headpiece, the joint sleeve extension curves to the vertical position in such a way that there is a vertical part. The end of the vertical part is the second end of the joint sleeve extension. In some embodiments, the joint sleeve structure further comprises a joint sleeve structure support part 421 extending from under the headpiece to the joint sleeve extension. The joint sleeve structure support part is configured to support the headpiece and to spread the stress forces from the headpiece to the joint sleeve extension.

At the second end of the joint sleeve extension 420 is a first fixing arrangement 418. The first fixing arrangement is meant for a leg arrangement. The leg arrangement is a straight pipe or a similar structure. In this embodiment, the first fixing arrangement is a straight part that has a circular cross-section, and that straight part features vertical flanges or grooves or similar structures. The leg arrangement is hollow at least at the end where it connects to the joint sleeve structure 406 and the first fixing arrangement. The upper part of the leg arrangement slides over the straight part. The vertical flanges or grooves prevent the leg arrangement from rotating when it is in place. Only vertical movements are possible. This feature reduces some of the noise caused by the leg arrangement moving. In some embodiments, the first fixing arrangement is a hollow tube that is fitted onto the end of the leg arrangement.

On the upper side of the curving part of the joint sleeve extension 420 is a second fixing arrangement 419. In some embodiments, the trampoline frame structure comprises a multitude of support pipes. These support pipes are placed vertically and they support, for example, safety equipment such as nets that prevent falls from the trampoline. Also, the support pipes may be configured to add some auxiliary equipment to the trampoline, such as grips, baskets or similar equipment. The second fixing arrangement is for that support pipe. The second fixing arrangement is a hole and a lower end of the support pipe slides into that hole. The walls of hole may have some structures to guide the assembly of the support pipe. The second fixing arrangement is configured in such way that the longitudinal axis of the support pipe and the longitudinal axis of the leg arrangement are parallel. The curvature shape of the joint sleeve extension 420 makes it possible to place the leg arrangement and the support pipe outside of the rim structure. The rim structure is more stable when there are no additional parts that connect directly to it.

Figure 5:
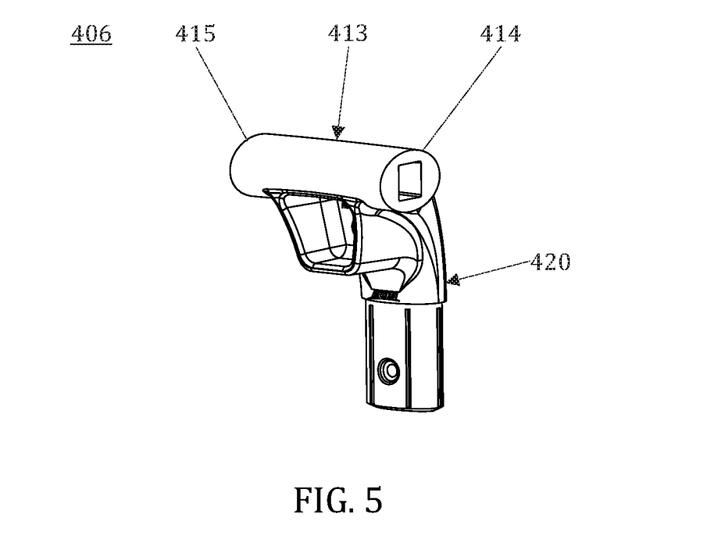
FIG. 5 depicts the joint sleeve structure presented in FIG. 4 as seen from the direction of the mat of the trampoline.

FIG. 5 shows the joint sleeve structure 406 presented in FIG. 4 as seen from the direction of the mat of the trampoline, i.e. from inside of the rim structure. The joint sleeve structure comprises the headpiece 413 and the joint sleeve extension 420, which is curved. The headpiece is fixed to the upper part of the joint sleeve extension in such a way that the headpiece forms a part of the rim structure when the joint sleeve structures and the transverse pipes are connected to each other as the rim structure. The joint sleeve structure support part 421 extends from under the headpiece to the joint sleeve extension. In this example, the joint sleeve structure support part is a hollow plate-like object, the sides of which are fixed to underside of the headpiece and the surfaces of the inner curve of the joint sleeve extension. This kind of structure reduces rotational forces caused by the headpiece and directs the stress forces to the stronger frame parts or its areas. The joint sleeve structure support can be implemented in many ways, depending on how large the forces are that act on the frame parts when the trampoline is in use. If there is a need for a very durable joint sleeve structure 406, the joint sleeve structure support can extend from the first end 414 of the headpiece to the second end 415 of the headpiece. However, the joint sleeve structure and its parts should be configured in such a way that contact between the joint sleeve structure and the transverse pipes is kept to a minimum to prevent the possible noise sources from emerging.

Figure 6:
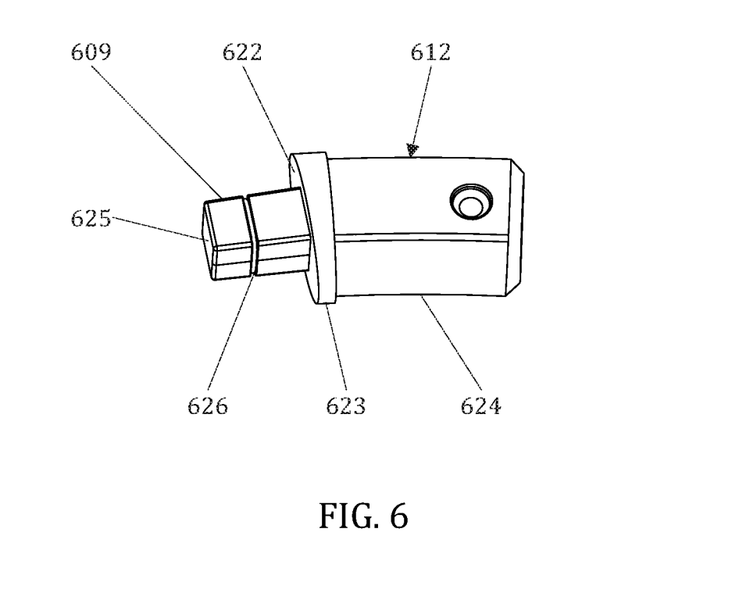
FIG. 6 depicts a connection extension and a transverse pipe end collar according to an embodiment.

In FIG. 6 is presented a connection extension 609 and a transverse pipe end collar 612 according to an embodiment. The transverse pipe end collar comprises a collar piece 623 and a setting part 624. The setting part is configured to be inserted into the hollow end of the transverse pipe. The collar piece is configured to form an end surface 622 of the transverse pipe. The end surface is configured to be inserted into one end surface of the headpiece, i.e. against the joint sleeve structure, when the joint sleeve structure and the transverse pipe are interconnected.

The connection extension 609 is at least partly pyramidical or conical object fixed to the end surface 622 of the transverse pipe, i.e. onto the collar piece. The bottom cross-section is rectangular in shape. The upright edges are bevelled. The top part of the connection extension is cut horizontally in relation to the end surface of the transverse pipe end collar 612, so that the connection extension has a flat top surface 625. In this embodiment, the connection extension comprises a connection groove 626. In some embodiments, in the socket wall is a holding element that is configured to be inside the connection groove when the transverse pipe is put in its place to form the rim structure. The holding element is configured to be elastic and it will slightly bend during placement and hold the transverse pipe when the transverse pipe is placed. The elasticity may be attained, for example, with some spring arrangement. Also, the holding element is configured to release the connection extension when sufficient longitudinal force (a force parallel to the connection extension) is applied on the holding element. In some embodiments, there may be some locking mechanism for locking and releasing the holding element.

It must be noted that the longitudinal axis of the connection extension 609 may be different than the longitudinal axis of the setting part 624 of the transverse pipe end collar 612 or the longitudinal axis of the transverse pipe. Of course, there are embodiments where said longitudinal axis are parallel or congruent.

Figure 7:
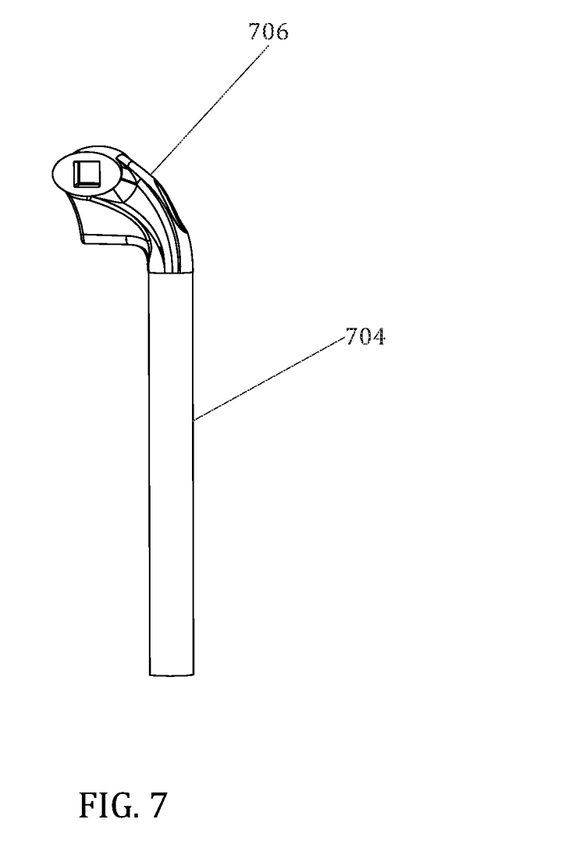
FIG. 7 depicts a second example of a joint sleeve structure and a leg arrangement according to an embodiment as seen from the side.

FIG. 7 shows a second example of a joint sleeve structure 706 and a leg arrangement 704 according to an embodiment as seen from the side. The joint sleeve structure comprises a headpiece and a curved joint sleeve extension. The joint sleeve extension is curved in such a way that when the leg arrangement is attached vertically to the joint sleeve structure, the leg arrangement is outside of the rim structure, meaning that the vertical axis of the leg arrangement is not in the same plane that the rim structure defines in the vertical direction. This allows the joint sleeve structure to move at the same pace as the transverse pipes, which are connected to both sides of the joint sleeve structure. Simultaneous movements of the transverse pipes and the joint sleeve structure reduce noise further.

Some advantageous embodiments of the device according to the invention have been described above. The invention is however not limited to the embodiments described above, but the inventive idea can be applied in numerous ways within the scope of the claims.

The invention claimed is:

1. A trampoline frame structure for supporting a mat, the frame structure comprising:
   multiple transverse pipes each having a first end of a transverse pipe and a second end of a transverse pipe,
   multiple joint sleeve structures configured to connect the transverse pipes to form a rim structure and
   leg arrangements, and
   wherein each joint sleeve structure comprises an elongated headpiece having a first end of the headpiece, a second end of the headpiece and a middlepoint of the headpiece,
   wherein at both ends of the headpiece a socket is arranged having a longitudinal axis and an angular cross-section of the socket,
   wherein the socket has a narrowing part that extends from the end of the headpiece to a point between the end of the headpiece and the middlepoint of the headpiece,
   wherein a diameter of the cross-section of the narrowing part is largest at the end of the headpiece and the cross-section narrows towards the opposite end of the narrowing part,
   wherein the transverse pipe comprises a first connection extension at the first end and a second connection extension at the second end, and the first connection extension and the second connection extension have an angular cross-section that corresponds to the cross-section of the socket, and
   wherein the first connection extension and the second connection extension are configured to fill the corresponding narrowing part at least partly to fit the corresponding socket to form the rim structure with the transverse pipes having the headpieces between them.

2. The trampoline frame structure according to claim 1, wherein:
   the cross-section of the transverse pipe is oval-shaped, and
   the transverse pipe has a first diameter and a second diameter, and the first diameter is parallel to the plane of the rim structure and the second diameter is transverse to the plane of the rim structure, and the first diameter is the largest diameter of the transverse pipe.

3. The trampoline frame structure according to claim 2, wherein the first diameter of the transverse pipe is at least 1.25 times larger than the second diameter of the transverse pipe.

4. The trampoline frame structure according to claim 1, wherein the angular cross-section of the socket at one end of the headpiece has one edge that is parallel to the first diameter and another edge that is parallel to the second diameter.

5. The trampoline frame structure according to claim 1, wherein the socket is configured such that when the connection extension is fit inside the socket, the socket has free space at the bottom of the socket, and the free space is a part of the narrowing part or some other part of the socket.

6. The trampoline frame structure according to claim 1, wherein the angular cross-section of the socket is rectangular in shape.

7. The trampoline frame structure according to claim 1, wherein the connection extensions comprise a first end of the connection extension and a second end of the connection extension, and the first end of the connection extension is on one end of the transverse pipe, and the second end of the connection extension is flat.

8. The trampoline frame structure according to claim 1, wherein a maximum diameter of the second end of the connection extension is smaller than a maximum diameter of the first end of the connection extension.

9. The trampoline frame structure according to claim 1, wherein the joint sleeve structure comprises a first fixing arrangement configured to accept the leg arrangement, and the first fixing arrangement is further configured such that when the leg arrangement is fixed to the joint sleeve structure the longitudinal axis of the leg structure is vertical and outside of the rim structure.

10. The trampoline frame structure according to claim 1, wherein the frame structure comprises a multitude of support pipes configured for safety equipment, and the joint sleeve structure comprises a second fixing arrangement that accepts the support pipe, and the second fixing arrangement is configured such that when the support pipe is fixed to the joint sleeve structure, the longitudinal axis of the support pipe and the longitudinal axis of the leg arrangement are congruent.

11. The trampoline frame structure according to claim 1, wherein the angles between side surfaces of the connection extension and the end of the transverse pipe are at least 55 degrees.

12. The trampoline frame structure according to claim 1, wherein the connection extension comprises opposite side surfaces, and tilt angles of these opposite side surfaces are identical.

13. The trampoline frame structure according to claim 1, wherein the joint sleeve structure is a joint sleeve extension extending downwards and outwards in relation to the rim structure, and the joint sleeve structure further comprises a joint sleeve structure support part extending from under the headpiece to the joint sleeve extension.

14. The trampoline frame structure according to claim 1, wherein at both ends of the transverse pipe a transverse pipe end collar is arranged, and the transverse pipe end collar comprises an end surface, and the end surface and the connection extension are configured such that the longitudinal axis of the connection extension is perpendicular to the end surface and the longitudinal axis of the connection extension and the longitudinal axis of the narrowing part of the socket are parallel when the transverse pipe is attached to the joint sleeve structure.

15. A trampoline comprising a frame structure having transverse pipes and joint sleeve structures, further comprising:
   multiple transverse pipes each having a first end of a transverse pipe and a second end of a transverse pipe,
   multiple joint sleeve structures configured to connect the transverse pipes to form a rim structure, and
   leg arrangements, and wherein:
   each joint sleeve structure comprises an elongated headpiece having a first end of the headpiece, a second end of the headpiece and a middlepoint of the headpiece,
   at both ends of the headpiece a socket is arranged having a longitudinal axis and an angular cross-section or the socket,
   the socket has a narrowing part that extends from the end of the headpiece to a point between the end of the headpiece and the middlepoint of the headpiece, a diameter of the cross-section of the narrowing part is largest at the end of the headpiece and the cross-section narrows towards the opposite end of the narrowing part, the transverse pipe comprises a first connection extension at the first end and a second connection extension at the second end, and the first connection extension and the second connection extension have an angular cross-section that corresponds to the cross-section of the socket, and the first connection extension and the second connection extension are configured to fill the corresponding narrowing part at least partly to fit the corresponding socket to form the rim structure with the transverse pipes having the headpieces between them.

* * * * *